United States Patent
Scholten et al.

(10) Patent No.: US 9,544,120 B2
(45) Date of Patent: Jan. 10, 2017

(54) VIRTUAL GATEWAY FOR A CONNECTED DEVICE

(71) Applicant: Unifythings, Inc., Boulder, CO (US)

(72) Inventors: Joss Scholten, Austin, TX (US); Kent Dickson, Boulder, CO (US); Garett Madole, Austin, TX (US)

(73) Assignee: Unifythings, Inc., Boulder, CO (US)

( * ) Notice: Subject to any disclaimer, the term of this patent is extended or adjusted under 35 U.S.C. 154(b) by 0 days.

(21) Appl. No.: 14/737,578

(22) Filed: Jun. 12, 2015

(65) Prior Publication Data

US 2015/0365217 A1 Dec. 17, 2015

Related U.S. Application Data

(60) Provisional application No. 62/011,804, filed on Jun. 13, 2014, provisional application No. 62/020,550, filed on Jul. 3, 2014.

(51) Int. Cl.
| | |
|---|---|
| *H04L 5/00* | (2006.01) |
| *H04B 7/14* | (2006.01) |
| *H04W 88/04* | (2009.01) |
| *H04W 88/16* | (2009.01) |
| *H04B 7/155* | (2006.01) |
| *H04L 12/729* | (2013.01) |

(52) U.S. Cl.
CPC ............ *H04L 5/0053* (2013.01); *H04W 88/04* (2013.01); *H04B 7/15507* (2013.01); *H04L 45/125* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 5,559,800 A | 9/1996 | Mousseau et al. | |
| 8,443,071 B2 | 5/2013 | Lu et al. | |
| 8,619,609 B2* | 12/2013 | Shuey | H04W 40/14 340/870.03 |
| 8,786,425 B1* | 7/2014 | Hutz | H04M 11/04 340/506 |
| 8,964,708 B2* | 2/2015 | Petite | G01V 1/364 340/870.02 |
| 9,113,358 B1* | 8/2015 | Lachwani | H04W 24/06 |
| 2003/0199247 A1* | 10/2003 | Striemer | H04B 7/155 455/11.1 |

(Continued)

OTHER PUBLICATIONS

Thomas, Shane, "International Search Report and Written Opinion re Application No. PCT/US15/35445", Sep. 15, 2015, p. 9 Published in: US.

*Primary Examiner* — Candal Elpenord
(74) *Attorney, Agent, or Firm* — Neugeboren O'Dowd PC

(57) ABSTRACT

A method and system for communicating to connected devices in a local environment are disclosed. The method may comprise receiving, at a head-end controller service, a command intent, the command intent indicating that a control signal should be send to a connected device. Then, the method may include sending the control signal to a virtual-gateway-enabled personal communication device that is within a local communication protocol transmission distance of the connected device. The method may further comprise relaying the control signal from the virtual-gateway-enabled personal communication device to the connected device.

26 Claims, 8 Drawing Sheets

(56) References Cited

U.S. PATENT DOCUMENTS

| | | |
|---|---|---|
| 2005/0024254 A1* | 2/2005 | Chuey .................... G08C 17/02 |
| | | 341/176 |
| 2007/0192486 A1 | 8/2007 | Wilson et al. |
| 2008/0270937 A1 | 10/2008 | Poulet et al. |
| 2009/0003251 A1* | 1/2009 | Imae .................... H04W 40/12 |
| | | 370/310 |
| 2010/0138007 A1 | 6/2010 | Clark et al. |
| 2010/0277300 A1 | 11/2010 | Cohn et al. |
| 2011/0230236 A1* | 9/2011 | Tsai .................... H04L 12/2818 |
| | | 455/557 |
| 2014/0036694 A1 | 2/2014 | Courtice |

* cited by examiner

VIRTUAL GATEWAY FOR A CONNECTED DEVICE

PRIORITY AND RELATED APPLICATIONS

The present application for patent claims priority to Provisional Application Nos. 62/011,804, filed Jun. 13, 2014, and 62/020,550, filed Jul. 3, 2014 both entitled "VIRTUAL GATEWAY FOR A LOCAL DEVICE" and assigned to the assignee hereof and hereby expressly incorporated by reference herein.

FIELD OF THE INVENTION

The present disclosure relates to wireless communication between devices. More specifically, but without limitation, the present disclosure relates to virtual gateways that use personal communication devices to communicate with connected devices.

BACKGROUND

Traditionally, remote location control of wired or wirelessly communicating devices in a building or other environment has been enabled by a physical controller ("hub") that contains multiple wireless radios, memory, storage, logic and a connection to the home router. Until recently, this controller has typically been a standalone, local-only device that enables communication between other local devices, the hub, and some sort of interface. More recently, this controller hub has been used as a means to reach a Head-end Controller Service via the internet, thus connecting some devices to other services that the internet enables. The establishment of this connection enables the remote Head-end Controller Service to gather data from and send commands to devices connected to the controller hub in the local premises.

Devices like Bluetooth speakers, fitness bands, and other wearables are currently available to communicate via direct, local protocols such as Bluetooth or Bluetooth Low Energy. However, these types of devices have relatively low reach which makes communicating with these types of devices via a fixed hub, which may be located anywhere in a home or environment, a difficult proposition.

Furthermore, it may be desirable in some instances to provide a person, such as a resident in a home, with the ability to more intelligently control multiple local devices in a convenient manner.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

SUMMARY

Figure 1:
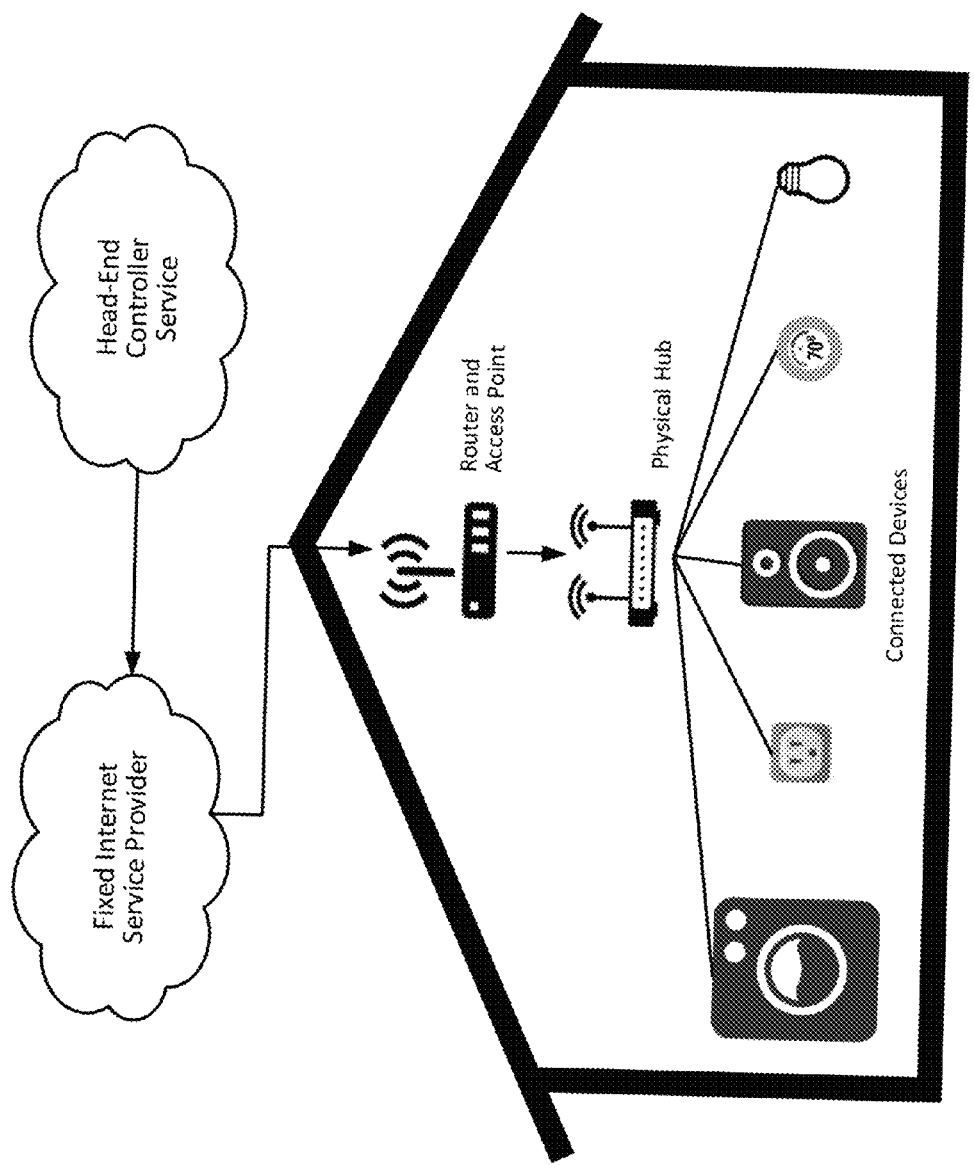
FIG. 1 illustrates a home environment according to the prior art.

One aspect of the present disclosure provides a method for communicating to connected devices in an Internet-of-Things (IoT) environment. The method may comprise receiving, at a head-end controller service, a command intent, the command intent indicating that a control signal should be send to a connected device. Then, the method may include sending the control signal to a virtual-gateway-enabled personal communication device that is within a local communication protocol transmission distance of the connected device. The method may further comprise relaying the control signal from the virtual-gateway-enabled personal communication device to the connected device.

Another aspect is a system for communicating to connected devices in an Internet-of-Things (IoT) environment. The system may comprise a head-end controller service configured to receive a command intent, generate a control signal, and send the control signal to a personal communication device. The system may also comprise an application or service on the personal communication device configured to allow the personal communication device to relay the control signal from the head-end controller service through the personal communication device to a connected device.

DETAILED DESCRIPTION

More and more home and work environments are being equipped with "smart" devices that may be connected to each other and to the Internet. Such devices are also known as "connected devices" and comprise what is known as of the "Internet of Things," or "IoT." Many ordinary household items are being re-engineered to connect them to the IoT, and to make them more convenient to users in a number of ways. As IoT devices proliferate, a number of competing platforms, protocols, and radios have come to market to allow these connected devices to connect to the Internet and to be controlled by remote services and/or a user. Often, these devices come with dedicated physical hubs (also known as network bridges) that must be installed alongside them to control their functions. Alternatively, connected devices may be controlled by proprietary remote head-end controller services via the Internet. Most, if not all of the devices come with a downloadable mobile device application to provide some kind of remote control access. One apparent challenge of having multiple devices from multiple manufacturers is the challenge of streamlining the ease of use for an individual user. It is not convenient to have separate mobile applications for each device one wishes to control. If it becomes complicated for a user to control all the connected devices in a home, the convenience purposes of the IoT devices themselves are defeated. A common solution to this problem are physical control hubs that are designed to consolidate the various device controls and protocols into one central user interface.

One main drawback to physical controller hubs is that the rate of innovation in IoT devices causes a high rate of obsolescence of the physical devices themselves. As previously mentioned, various IoT devices communicate using different short and long-range transmission protocols and have different kinds of wireless radios. A number of competing communication platforms exist, and even if a certain segment of the industry coalesces around a particular protocol or a protocol standard for a while, the standard will be upgraded over time, and even long-standing platforms eventually give way to faster, newer, and better platforms. At the present, a physical controller hub might ideally be equipped with radios to communicate over Wi-Fi, Bluetooth, Bluetooth Low Energy, Zigbee, 4G, LTE, NFC, and others. In two years some of those radios listed may be obsolete; and possibly, most IoT devices will use another type of radio not even listed. Physical hubs often cost $200 to $500, and consumers are likely to be dissatisfied if they are continually required to upgrade such devices in order to make their new IoT devices work.

However, consumers are used to upgrading certain devices in their lives fairly frequently; namely, personal communication devices such as smartphones, wearables, tablets, and even laptops and desktop computers. For the purposes of this disclosure, the term "personal communication device" will be used to refer to a computing device that is primarily used, and highly equipped for multiple modes of interpersonal communication. For example, personal communications devices can include smartphones that are primarily used for texting, calling, and social media, smartwatches that are primarily used for personal information, updates, notifications, and activity tracking, tablets that are primarily used for web browsing and media consumption, smart TVs that are used primarily for media consumption, and desktop computers that are primarily used for creating documents, sending e-mails, and playing games. Personal communications devices are often mobile, but they are not limited to only mobile devices in this disclosure. Personal communication devices may be distinguishable from physical controller hubs in that physical controller hubs are primarily for facilitating communications between IoT devices, and that interaction between a user and a hub may primarily be for set-up and connected device programming purposes. For the purposes of this disclosure, IoT or connected devices may be distinguishable from personal communication devices in that they may have one, or only a few, dedicated purposes and are relatively stationary in a home or work environment. That is, IoT or connected devices in this disclosure refer to devices that generally remain in one local home or work environment.

An aspect of the present disclosure is a virtual gateway, comprising a remote head-end controller service (HECS) that may utilize the hardware of a personal communications device to relay control signals to one or more IoT device, thereby enabling the personal communications device to act as the physical hub in place of a dedicated physical hub. The virtual gateway may utilize the hardware of a personal communications device via an application or a service that is downloaded onto the personal communications device. A benefit of the disclosure is that the remote head-end controller service may be centrally upgraded (whether via hardware, software or firmware), and the application may also be upgraded via the HECS in order to meet the communication platform requirements of new IoT devices, but no hardware of the consumer must necessarily be upgraded. It is contemplated that if many new IoT devices adopt a communication standard that requires a new kind of transceiver or radio, many other personal communications devices are likely to be equipped with the same kind of transceiver or radio. Users of IoT devices are likely to upgrade their personal communications devices frequently, and may then utilize their personal communications devices as a virtual gateway rather than purchasing a new physical controller hub.

Referring now to the drawings, where like or similar elements are designated with identical reference numerals throughout the several views, and referring in particular to FIG. 1, shown is a home IoT environment according to the prior art, in which a physical hub 101 creates local connections to connected device 102-106. The physical hub is connected to the internet via a router or access point 107, which itself connects to one or more remote head-end controller services 109 via a fixed internet service provider 108.

Figure 2:
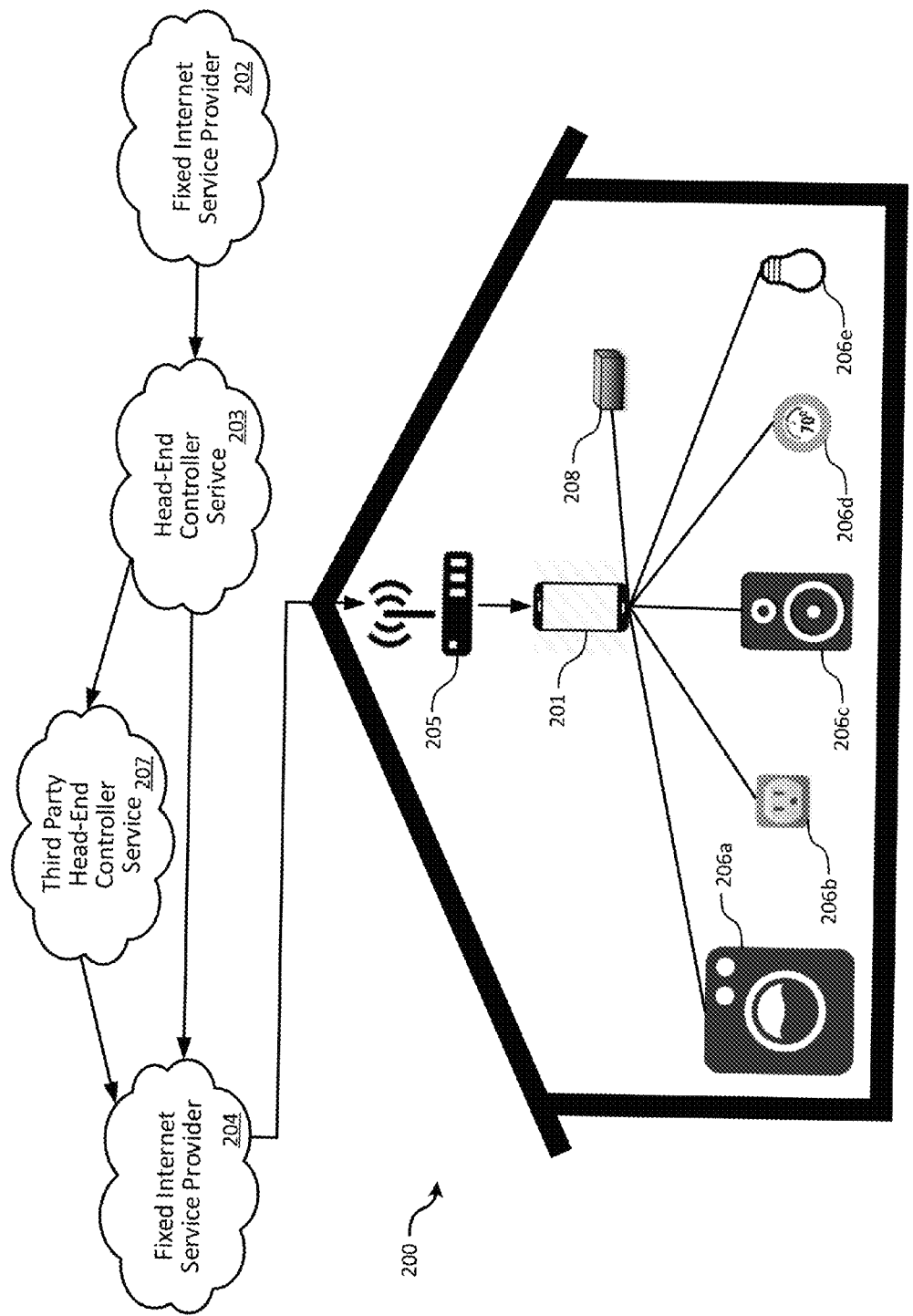
FIG. 2 illustrates a system according one embodiment.

Turning now to FIG. 2, shown is a system 200 according to one embodiment of the present disclosure. The system 200 includes a personal communication device 201, a mobile data connection 202, a head-end controller service (HECS) 203, an internet service provider 204, an access point 205, and a plurality of local devices 206a-206e. The system may in some embodiments include a third party proprietary HECS 207 and/or a network bridge 208. Some aspects of the present invention may be characterized as a virtual gateway comprising a downloadable software application that may utilize one or more personal communication devices 201, such as mobile phones, tablets, wearable devices such as smartwatches, or other pre-existing communications devices that may have software downloaded on them by the device owner, supplier, or other party. In some embodiments, part or all of the software may be stored in a remote applications network, which may include a computer system 600 and/or an HECS 203 for use by the personal communication device 201. In some embodiments, the HECS 203 may be implemented in remote public or private servers, including those commonly known as "cloud" servers.

At a high level, the system 200 includes a personal communication device 201 configured to monitor and/or control, directly or indirectly, a plurality of local connected devices 206a-206e. The personal communication device is enabled as a virtual gateway, which may be implemented in a downloadable software application, service, or other logic as described herein. Throughout this disclosure, where reference is made to personal communication devices that function as virtual gateways, it may be assumed that the personal communications devices are enabled with some implementation of a virtual gateway, though an application, service, or logic is not always specifically mentioned.

Still referring to FIG. 2, the system 200 may comprise local connected devices, which may include, without limitation, and by way of example only, a washing machine 206a, an electrical outlet 206b, a sound system 206c, an environment control/sensor 206d, and a light system 206e. It should be understood that the term "local connected device" is used herein to refer to any IoT device within an environment which is desired to be controlled or monitored. Although a static residential environment is shown in the figures, any environment, including a static commercial environment and/or a dynamic environment, may be considered a local environment for the purpose of this disclosure. A local environment may be a group of devices which have historically been controlled of connected by a local area network (LAN), Wi-Fi, Bluetooth, Zigbee, or other local connection.

The personal communication device 201 is in constant or intermittent communication with a mobile data connection 202 which may be a cellular service provider. Through either the mobile data connection 202 or the internet service provider 204, the personal communication device 201 is in communication with a head-end controller service (HECS) 203 on an intermittent basis. For example, the personal communications device 201 may be configured to request and/or receive signals from the HECS 203 periodically.

The internet service provider 204 is configured to provide internet service to the local environment through the access point 205 which may include a wireless router. The access point 205 forms the local TCP/IP network and local connected devices 206a-206d and 208 may join that network as their primary means of communicating locally and to the internet.

In some embodiments, a local device 206e may be configured to receive control signals from a third party network bridge 208 instead of from a personal communication device 201 and/or an access point 205. For example, many available IoT devices come with physical network bridges that enable the devices to communicate with the local access point 205 or with third party proprietary head-end controller service. Certain IoT devices may require such network bridges because they require constant communication in order to function, and must have the constant communication even if there is no central hub in the environment. For example, an alarm system almost always requires its own network bridge because a purchaser would expect the alarm system to always work without the purchase of an extra physical controller hub or with without the virtual gateway of the present disclosure. However, other devices are often sold with connectivity as a secondary feature, rather than a primary feature. A consumer may connect such devices if they already have an existing hub or other way to connect it, but the device may be designed primarily to use on a standalone basis. For example, a single Bluetooth speaker may have the capability to be connected to the entire LAN via Wi-Fi or Bluetooth, but does not necessarily have to be connected in such a manner. It may still be used, without connection to the entire LAN, via a Bluetooth connection to just one media player. Further, devices such as speakers, televisions, or washers and dryers may not often be used if no one is home, and therefore, they are not likely to be equipped with a constant connection to the internet via a physical hub.

There are other types of IoT devices, however, such as a local connected device 206d, that may be limited to receiving instructions from a third party proprietary HECS 207. That is, the local device 206d may be permanently disabled from receiving control instructions from any controller other than the third party proprietary HECS 207 associated with that local device 206d. Certain IoT thermostat systems, for example, may use proprietary HECS 207 because they constantly receive local weather input and other information from the internet in order to function. To overcome this problem, the HECS 203 of the present invention and/or the personal communication device 201 may be configured to route instructions to a third party network bridge or to a the third party proprietary HECS 207, which, in turn, may appropriately control the local device 206d.

Figure 3:
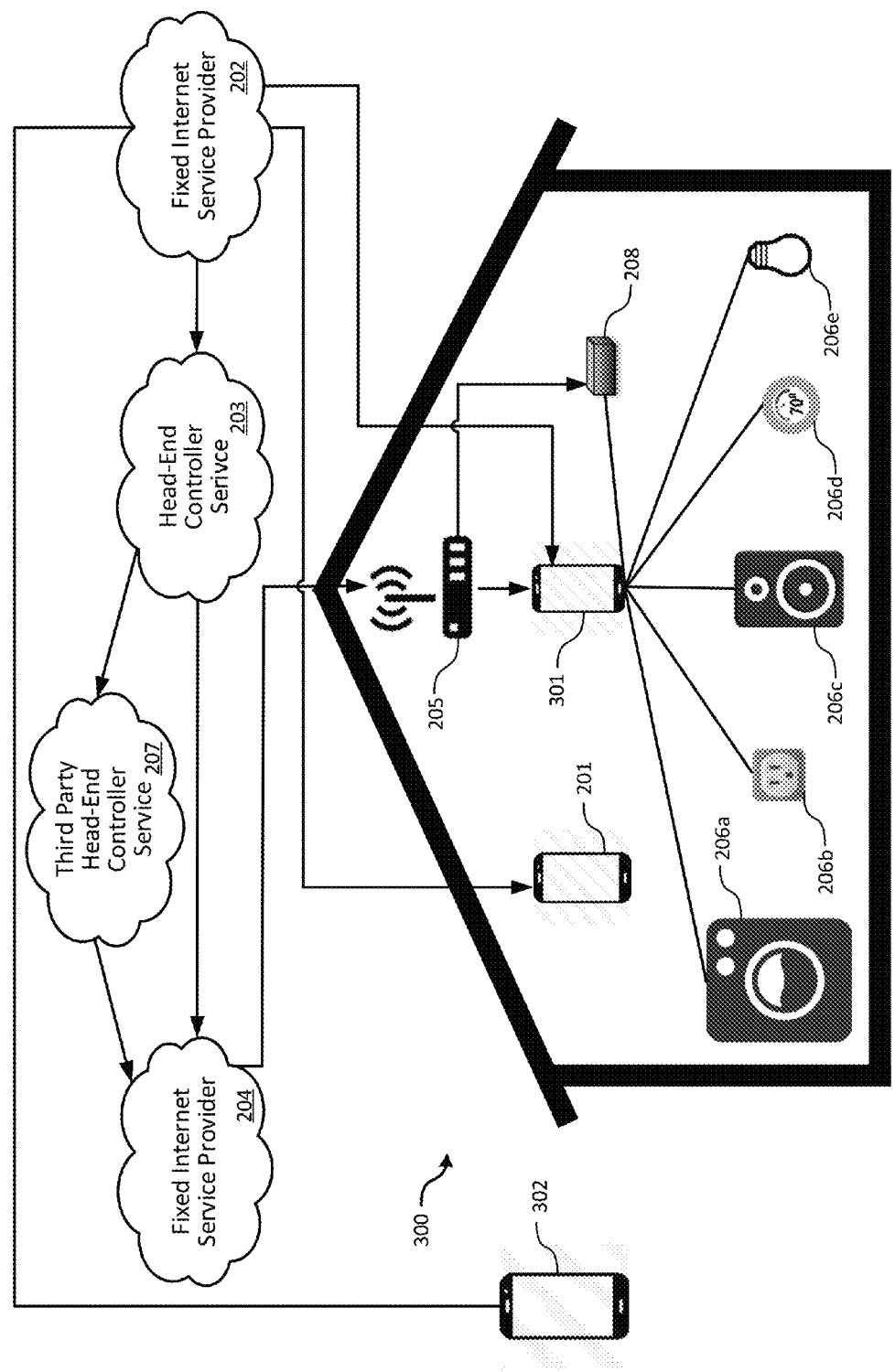
FIG. 3 illustrates a system according to another embodiment.

Turning now to FIG. 3, shown is another embodiment of a system 300. In addition to all of the components of FIG. 2, the system 300 may include a plurality of personal communication devices 201, 301, 302. The plurality of personal communication devices 201, 301, 302 may be located such that a plurality of personal communication devices 201, 301 are within the local environment, while one personal communication device 302 is outside the local environment, as shown, although it should be understood that many of the plurality of personal communication devices 201, 301, 302 may be inherently mobile, and may pass in or out of the local environment at the will of the user(s) carrying the personal communication device(s) 201, 301, 302.

In the system 300, the HECS 203 may be configured to evaluate state information and other environmental information associated with one or more of the personal communication devices 201, 301, 302. State information may include how long a personal communication device has been idle, when it is being used, what applications it is using, battery information, and connectivity information. Such state information may be provided to the HECS 302 through subscriptions available through mobile service providers and/or device operating system APIs. Environmental information may include geolocation, sensory information from accelerometers, gyroscopes, light sensors, or sound sensors on the device, local weather, time of day, calendar information, etc. Many such types of environmental information are known in the art, and some can also be provided to the HECS 302 through subscription services. There are many possible ways in which state information and/or environmental information may be used to implement aspects of the present disclosure. One such way is to use a combination of location and connectivity information to determine which of a plurality of possible personal communication devices would be most optimal to use to relay a signal to a particular local connected device. For example, a user may desire to turn on a particular device such as a sound system 206c. The HECS 203 may determine that a first personal communication device 201, although located in the local environment, does not have a strong signal connection with the sound system 206c because it is far away, a second personal communication device 301 does have a strong connection with the sound system 206c because it is close, and a third personal communication device 302 has no connection at all because is not in the local environment. The HECS 203, upon making this determination, is configured to cause the second personal communication device 301 to relay instructions for operating the sound system 206c. One benefit of using a HECS 203 to determine a best path for a control signal in this manner is that the reliability of signal transmission may be increased in instances where local connected devices are often spaced apart near or beyond the typical ranges of short-range communication protocols. Embodiments and examples of determining a best path will be discussed in greater detail throughout the disclosure.

In some embodiments, the way in which a personal communication device is configured to be able to relay control signals to local devices in a particular environment is through a downloadable software application. In many embodiments of the application, users may gain authorization to control devices in a particular environment. Such authorization may be set up through, for example, a network administrator or a homeowner, who has access to a local Wi-Fi SSID and password, and who may have set up all the connected devices in an environment. The network administrator or homeowner may then allow other users to control local devices in the environment and grant various permission levels. For example, a parent may have control of all devices in the household via an application on his or her personal communication device, and a child may have control over all the devices except for the door locks and the television.

In some embodiments, a user of a personal communication device may control connected devices in a particular environment even when the user is not connected to the environment's local area network. For example, a user of a third personal communication device 302 may wish to control a local device 206b, such as an outlet, to turn on a light while away on vacation. The personal communication device 302 may have a mobile data connection, which allows a command signal to be sent from the personal communication device 302 to the HECS 203. Here, the third personal communication device 302 and/or the HECS 203 may be configured such that a command signal is received at the HECS 203 from the third personal communication device 302 and transmitted to a personal communication device having local connectivity, such as the personal communication device 301, to control the local device 206b.

As another example, the HECS 203 and/or a personal communication device 301 may be configured to detect an activity of a user, and to respond to that activity by controlling a local device in a particular manner. For example, it is believed that the first thing that many people do in the morning is pick up their personal communication devices 201. State information and environmental information would include that the device has been idle for several hours, that it is now moving, or is on, and that the time of day is 6:30 am. Upon receiving this state and environmental information associated with a movement of the personal communication device 201, the HECS 203 may be configured to operate local device 206b to start coffee, operate local device 206d to adjust the environment control, and to operate local device 206e to turn on the light in the kitchen—but perhaps only if at that time of the year, the user is awake before sunrise.

In some embodiments of the disclosure, state and environmental information may be stored and programmed by a user to be re-used in the future. For example, a user may program the virtual gateway to create "scenes" or "macros" that combine a number of items of state and environmental information to automatically send a number of commands to various IoT devices. For example if a user is home on a weeknight, and it is after 11:00 pm, and the user walks into the bedroom, all the lights in the house may turn off, the doors may all lock, the alarm may be set, and the thermostat may be set to 68°. In other embodiments, state and environmental information may be detected in combination with particular commands to certain IoT devices in such a way that they form a pattern. The pattern may be used to prompt a user to automatically send certain commands to particular IoT devices when parts of the pattern are detected in the future. For example, if on a Friday night, at approximately 8:00 pm, a user often turns off most of the lights in the house, turns on the TV, and watches a movie, the next time it is Friday night around 8:00 pm and the user is in the house, the system may ask the user via a prompt on a personal communication device if the user is going to watch a movie. If the user responds yes, the system may send commands to the TV to turn on and the lights around the house to dim. In other embodiments, stored information may be used to learn patterns of user behavior without user input. For example, if a user's personal communications device is detected to be approaching the house at a speed indicating that the user is in the car, the garage door may open, the doorway from the garage to the house may unlock, the alarm may be disarmed, and the main living room lights may be turned on. It is contemplated that in most embodiments, some type of verification prompt may ask a user for permission to send all of these control signals, at least the first time, for security reasons.

In some embodiments, a virtual gateway 201 does not necessarily need to actually be joined to a local TCP/IP network, such as Wi-Fi, to enable communication between cloud and local devices 206a-e. For example, the virtual gateway 201 may be connected to the HECS 203 by a mobile data connection, such as 4G, and may be connected to local devices by short-range, non-TCP/IP transmission protocols, such as Bluetooth, Zigbee, and similar protocols.

In some embodiments, the previously discussed patterns, scenes, macros, or other pre-programmed commands may be cached at the virtual-gateway-enabled personal communication device. The virtual gateway increases the odds that manual or cached control requests will succeed even when a HECS is unavailable. It is contemplated that a HECS itself may experience outages due to power failure of a server on which it runs, or due to periodic maintenance or updates, for example. Alternatively, a HECS may be unavailable to a particular personal communication device because of a service outage of the mobile data connection or the fixed internet service provider. In instances where a HECS is unavailable, local device may still receive certain commands from a personal communication device. For example, the application on a personal communication device may cache a set of commands in a local memory of the device. The stored commands may include learned patterns, user-programmed patterns, or commands based on certain state or environmental information. The user-programmed pattern discussed earlier in which a user goes to the bedroom after 11 pm may still be triggered because the set of triggering state and environmental information may be detected at the personal communication device itself, the related command signals may be stored at the personal communication device, and the command signals may be sent from the personal communication device to the connected devices via a short-range transmission protocol.

Figure 4:
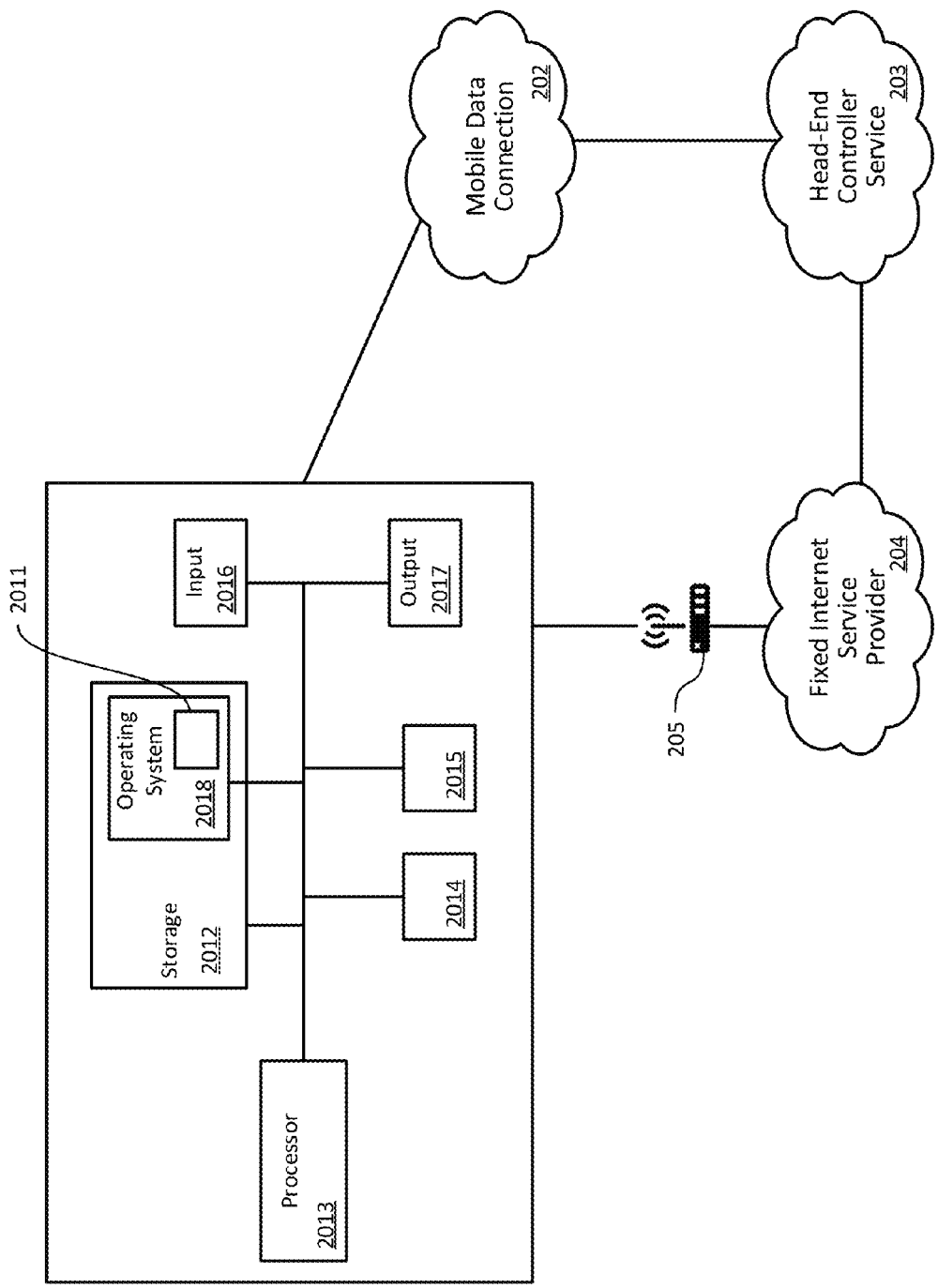
FIG. 4 illustrates an example personal communication device according to some embodiments.

Turning now to FIG. 4, a detailed schematic of an embodiment of the personal communication device 201 depicted in FIGS. 2-3 is now discussed. The personal communication device 201 includes a virtual gateway 2011 that is stored or retained in a storage device 2012, and configured to interface with a processor 2013, a memory 2014, a communication interface (I/F) 2015, input device 2016, and output device 2017. As previously mentioned, the personal communication device 201 is configured to communicate with an HECS 203 via either a mobile data connection 202 or an internet service provider 204 by way of a local Wi-Fi router and access point 205.

The storage device 2012 may include any suitable device operable for storing data and instructions. The storage device 2012 may include, for example, a magnetic disk, flash memory, optical disk, or any other suitable data storage device, and the storage device 2012 may include the virtual gateway 2011 and an operating system. The operating system 2018 may be any embedded operating system suitable for a mobile or lightweight fixed device. Examples include, without limitation, Android, iOS, Linux, Tizen, etc.

The virtual gateway 2011 may include any suitable logic embodied in computer-readable media, that, when executed, is operable to enable a user to communicate with the HECS 203 to view and manipulate data. For example, the virtual gateway 2011 may include logic for receiving data from the input device 2016 and translating the data into a signal to be sent to the HECS 203, as well as providing a user with a visual, audio, and/or vibrating signal related to parameters about the user's location, local devices 206a-206e, messages, and, in some embodiments, information about another personal communication device 301, 302. The virtual gateway 2011 may be configured to cause the personal communication device 201 to periodically request the most recent state or environmental information from the HECS 203.

Continuing with FIG. 4, the virtual gateway 2011 may be configured to cause the personal communication device 201 to give the user audio and/or visual feedback when the user is in the vicinity of one or more local devices 206a-206e. In some embodiments, the virtual gateway 2011 may, based on a user's approach to a first local device 206a, cause the personal communication device 201 to transmit state or environmental information about the user's location to the HECS 203. Based on these parameters, the HECS can make decisions about how to control the first local device 206a and a different local device 206b-206e. That is, the HECS 203 may determine that a first personal communication device 201 is not a preferred route, and that a second or other personal communication device 301, 302, if available, is a more preferred route to increase the chances that the control signal is received properly. In some embodiments, the HECS 203 may process the state or environmental information from a first personal communication device 201 into a signal to a second personal communication device 301, 302. A virtual gateway 2011 within the second personal communication device 301, 302 may respond by causing the second personal communication device 301, 302 to relay a control signal to one or more of the local devices 206a-206e.

Some embodiments of the virtual gateway 2011 or portions of the virtual gateway 2011 may be transient in relation to a particular local IoT environment because they are likely on a personal communication device. That is, the virtual gateway 2011 may move about from one environment to another, thereby giving the user the flexibility to control local devices in a number of environments, examples of which will be described later in this disclosure. This feature can be used advantageously in a variety of ways to enable a number of utilitarian applications.

The system 300 may also be configured to cause the virtual gateway 2011 to relay a message(s) to a local device 206a-206e in one or more of a variety of ways, and the response may be user-selected in some embodiments. For example, the system 300 may cause the virtual gateway 2011 to relay a message to light 206e to turn on when the personal communication device 201 is transported to within a preset area of the light 206e or the premises in which it resides. The response may include relaying state, state change, or environmental information to the HECS 203 to be made available for context-related control of other local devices 206a-206d.

Throughout this disclosure, the term "control signal" may be used to describe a signal relayed from a virtual gateway at a personal communication device to a local connected device. These control signals may be generated at the HECS 203 itself in response to a "command intent." The term "command intent" is used in this disclosure to encompass all "commands" whether they are actively or passively sent by either a user, a HECS, or another source. That is, a user, a HECS, or another source may, at one time, actively send a command in real time regarding a particular device, but in many cases, the user or the HECS will set up commands to be sent at times in the future in response to a trigger, creating a passively sent command in the future. "Command intent" also encompasses commands regardless of what person, computer, or device is responsible for causing a command to be sent. For example, sometimes the command will be sent upon the active intent of the user, other times it will be sent upon the intent of the manufacturer of a particular IoT device, and other times it will be sent upon the intent of the HECS 203.

In some embodiments, a control signal may be initiated when a user transports the personal communication device 201 to a physical location, such as a street located at a predetermined distance from home, or within a predetermined distance of a light fixture. More specifically, the HECS 203 and/or the personal communication device 302 may detect an approach of a user to a home even before the personal communication device 302 is within the range of the local environment. The HECS 203 may then, instead of controlling through the personal communication device 302, signal through the internet service provider 204 to another personal communication device 201, 301, such as one with a family member in the home, and/or the network bridge 208 that a light 206e should be turned on prior to the arrival of the user of the outside personal communication device 302. In some embodiments, a user over-ride may be included in the virtual gateway 2011, to prompt a user to confirm whether the light 206e should be turned on.

The processor 2013 may include any suitable device operable to execute instructions and manipulate data to perform operations for the personal communication device 201. The processor 2013 may include, for example, any type of central processing unit (CPU), and may be responsive to instructions from the virtual gateway 2011.

The memory 2014 may include any computer memory (for example, random access memory (RAM) or read only memory (ROM) or onboard flash memory), mass storage media (for example, a hard disk), removable storage media (for example, a microSD card), database and/or network storage (for example, a server). The memory 2014 may comprise any other computer-readable tangible medium, or a combination of any of the preceding.

The interface (I/F) 2015 may include any suitable device operable to receive input for the virtual gateway 2011, send output from the virtual gateway 2011, perform suitable processing of the input or output, or both, communicate to other devices, or any combination of the preceding. I/F 2015 may include appropriate hardware and software, including protocol conversion and data processing capabilities, to communicate to other devices. I/F 2015 may include one or more ports, conversion software, or a combination of any of the preceding.

The output device 2017 may include any suitable device operable for relaying information to a user. The output device 2017 may include, for example, a touch screen, a video display, an audio signal, a vibrating alert, or other suitable output device.

The input device 2016 may include any suitable device operable to input, select, and/or manipulate various data and information. The input device 2016 may include, for example, a touch screen, keypad, microphone, or other suitable input device.

Continuing with FIG. 4, the HECS 203 may be configured to allow a user to access the HECS 203 by way of a computing device that is not necessarily a personal communication device 201 to add, delete, or otherwise modify rules for controlling local devices 206a-206e. For example, a user may log in from a work computer to view thermostat settings for a temperature control 206d, and add or remove, temporarily or permanently, a temperature control rule. This access to the HECS 203 may be through a web portal or a Software as a Service (SaaS) interface. A user may be able to create scenes or macros, ad previously described, and may create permissions levels and access to various devices for different users in a particular IoT environment. Additionally, a user may be able to create scenes or set other user permissions levels across multiple IoT environments over which he or she has administrative authority through one HECS access portal. In many embodiments, though, a web portal or SaaS portal may not be required at all, and functionality that allows a user to control settings on a HECS may be available entirely through an application that comprises the virtual gateway 2011.

The personal communication device 201 enabled with a virtual gateway 2011 serves as an approximation of a physical controller, thereby eliminating the need for a physical hub. When one or more of the personal communication devices 201 comprising virtual gateways 2011 is within range of a connected local device 206*a*-206*e* that a user has an interest in controlling or receiving status updates from, the virtual gateway(s) 2011 may relay status data and commands between the HECS and one or more connected local devices 206*a*-206*e* within the premises or network, without the need for a separate fixed controller, such as the physical hub shown in FIG. 1.

Figure 5:
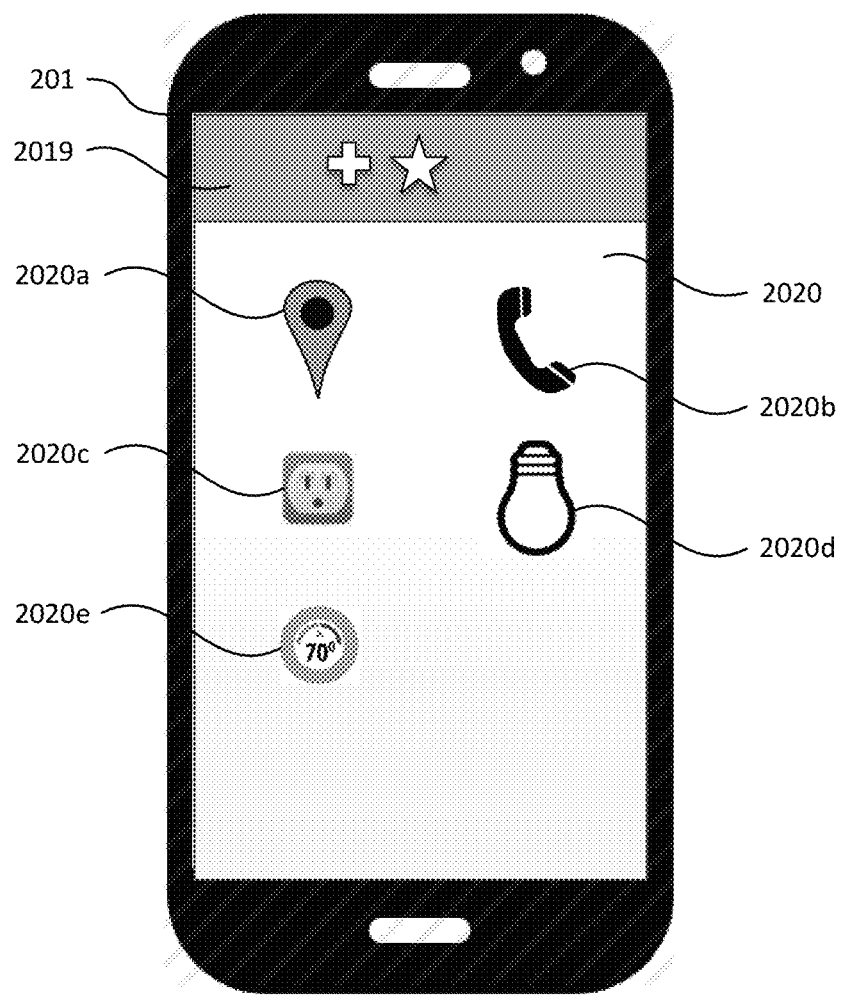
FIG. 5 illustrates an example personal communication device interface according to some embodiments.

Turning now to FIG. 5, an example user interface of the system 300 is now discussed. The user interface may include one or more of a touch screen, audio, keypad, and visual interface. Shown in FIG. 5 is a personal communication device 201 having a virtual gateway main menu 2019, and a local device menu 2020 having selection buttons 2020*a*-2020*e*. Other selection buttons may of course be present although they are not depicted in FIG. 5.

The virtual gateway main menu 2019 may be configured to allow a user to access and/or view recommended pre-configured rules, create a new rule, or logout of the system 300. Pre-configured rules may include many of the IoT device control signals described throughout the disclosure, such as turning on a particular light when a personal communication device is within a particular distance of the light. Creating a new rule may comprise any command for a control signal to be sent upon the occurrence of any event. An example of a rule that may either be pre-configured or created by a user is that if a nearby speaker is playing music, and the personal communication device acting as a virtual gateway for the speaker accepts a telephone call, the virtual gateway may send a control signal to the speaker to mute or turn down. Sets of multiple conditions and/or rules corresponding to the conditions may be referred to as scenes or macros. Users may enable, disable, or change pre-configured macros, or create new macros, using selection buttons on the virtual gateway interface. Touching one of the (touch screen) selection buttons 2020*a*-2020*e* may open a sub-menu for the user to control and/or view events from the related local device 206*a*-206*e*. Additional functions of a virtual gateway application may include discovery, onboarding, and authentication of local connected devices, which may include accepting user input of SSIDs and passwords.

Figure 6:
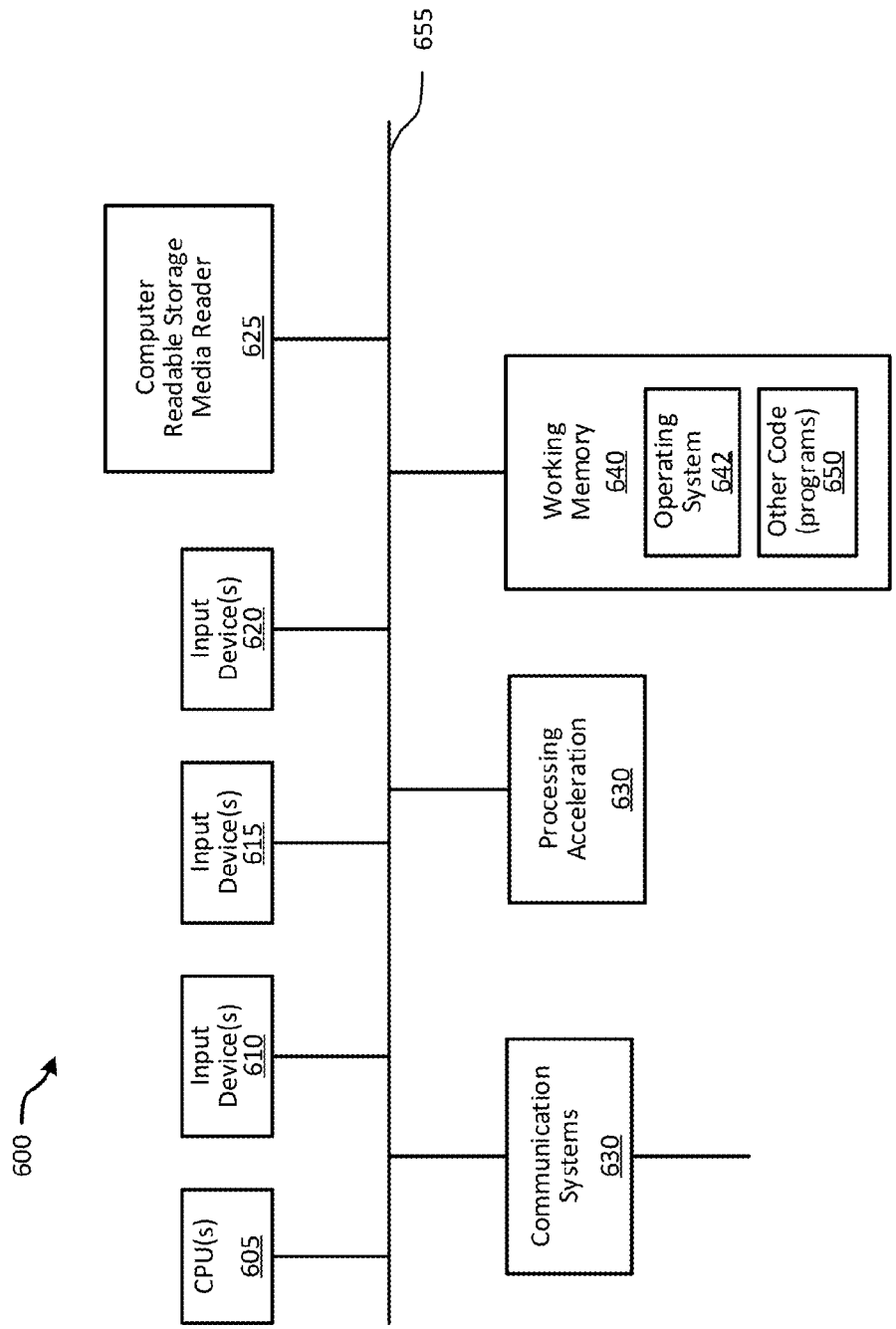
FIG. 6 illustrates an example computer system implemented in some embodiments.

Turning now to FIG. 6, a block diagram illustrating an exemplary computer system 600 which may be implemented by some embodiments of the present invention is now discussed. This example illustrates a computer system 600 such as may be used, in whole, in part, or with various modifications, to provide various components of the systems 200, 300 discussed above.

The computer system 600 is shown comprising hardware elements that may be electrically coupled via a bus 655. The hardware elements may include one or more central processing units (CPUs) 605, one or more input devices 610 (e.g., a mouse, a keyboard, etc.), and one or more output devices 615 (e.g., a display device, a printer, etc.). The computer system 600 may also include one or more storage devices 620. By way of example, and without limitation, the storage device(s) 620 may be disk drives, optical storage devices, solid-state storage device such as a random access memory ("RAM") and/or a read-only memory ("ROM"), which can be programmable, flash-updateable and/or the like. The computer system 600 may additionally include a computer-readable storage media reader 625, a communications system 630 (e.g., a modem, a network card (wireless or wired), an infra-red communication device, etc.), and working memory 640, which may include RAM and ROM devices as described above. In some embodiments, the computer system 600 may also include a processing acceleration unit 635, which can include a DSP, a special-purpose processor and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 620 and/or any other computer described above with respect to the computer system 600.

The computer system 600 may also comprise software elements, shown as being currently located within a working memory 640, including an operating system 642 and/or other code 650. It should be understood that alternate embodiments of a computer system 600 may have numerous variations from that described above. For example, customized hardware might also be used and/or particular elements might be implemented in hardware, software (including portable software, such as applets), or both. Further, connection to other computing devices, such as network input/output devices, may be employed.

Software of the computer system 600 may include other code 650 for implementing any or all of the function of the various elements of the architecture as described herein. For example, software, stored on and/or executed by a computer system such as system 600, can provide the functions of the HECS 203, a manager, an end device, a personal communication device 201, 301, 302, etc.

Modifications, additions, or omissions may be made to the personal communication device 201, 301, 302 and/or the HECS 203 without departing from the scope of this disclosure. The components of the personal communication device 201 may be integrated or separated. In particular, it may be desirable to include some functionality and logic within the virtual gateway 2011, and other logic or code at the HECS 203 to maximize communications efficiency. Specifically, the operations of the personal communication device 201, 301, 302 may be performed by more, fewer, or other components. For example, although the virtual gateway 2011 is displayed as part of the storage device 2012, the virtual gateway 2011 may be stored in any suitable location, and the operations of the virtual gateway 2011 may be performed by more than one component, including some components of the computer system 600 and/or the HECS 203 in some embodiments. Additionally, operations of the personal communication device 201 may be performed using any suitable logic.

Figure 7:
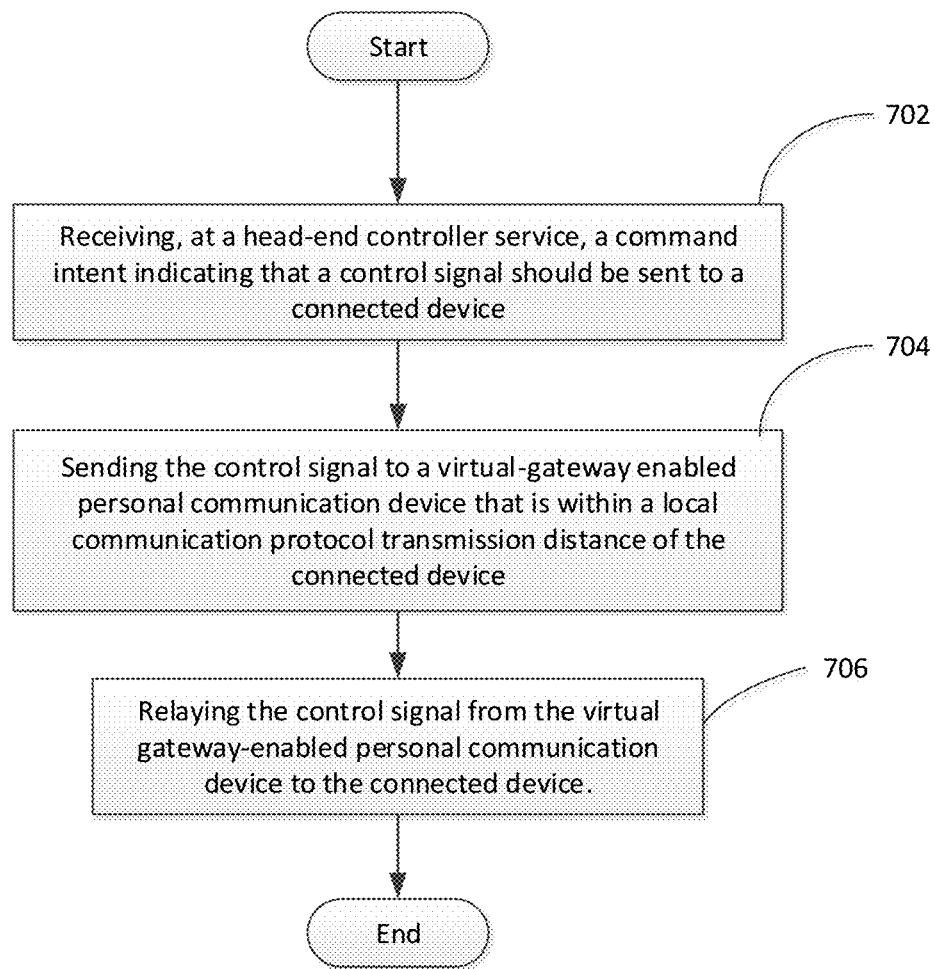
FIG. 7 illustrates a method of controlling a local device according to some embodiments.

Turning now to FIG. 7, a method 700 according to some embodiments is now discussed. The method 700 may first comprise, at 702, receiving, at a head-end controller service, a command intent indicating that a control signal should be sent to a connected device. Then, at 704, the method may comprise sending the control signal to a virtual-gateway enabled personal communication device that is within a local communication protocol transmission distance of the connected device. Then, at 706, the method may comprise relaying the control signal from the virtual gateway-enabled personal communication device to the connected device.

A head-end controller service such as the HECS 203 previously discussed in this disclosure may receive a command intent in a number of ways. For example, receiving a command intent at 702 may include receiving state or environmental information indicating that a user of a personal communication device 201 has awakened, and, based on a predetermined rule, derive that a command intent has been issued. The command intent may include an intent to operate one or more local devices, such as the local devices 206a-206e previously discussed. Receiving a command intent at 702 may include evaluating a desired command submitted from a personal communication device 201 to an HECS 203, evaluating a predetermined rule stored within a computer system 600 within the HECS 203, or evaluating activities at a personal communication device 201 and deriving a command intent therefrom.

Once the command intent is received, the method 700 includes, at 704 sending the control signal to a virtual-gateway enabled personal communication device that is within a short-range communication protocol transmission distance of the connected device. Sending a control signal 706 may include sending a control signal through a mobile data connection 202 to a virtual gateway 2011, or sending a control signal through an internet service provider 204 and access point 205 to a virtual gateway 2011. Then, the method 700 may also include relaying the control signal from the virtual-gateway-enabled personal communication device. The relaying may include relaying a control signal to control a local device 206a-206e over a different communication protocol (e.g., Bluetooth) than the communication protocol (e.g., TCP/IP) used to send the control signal to the virtual-gateway-enabled personal communication device.

Figure 8:
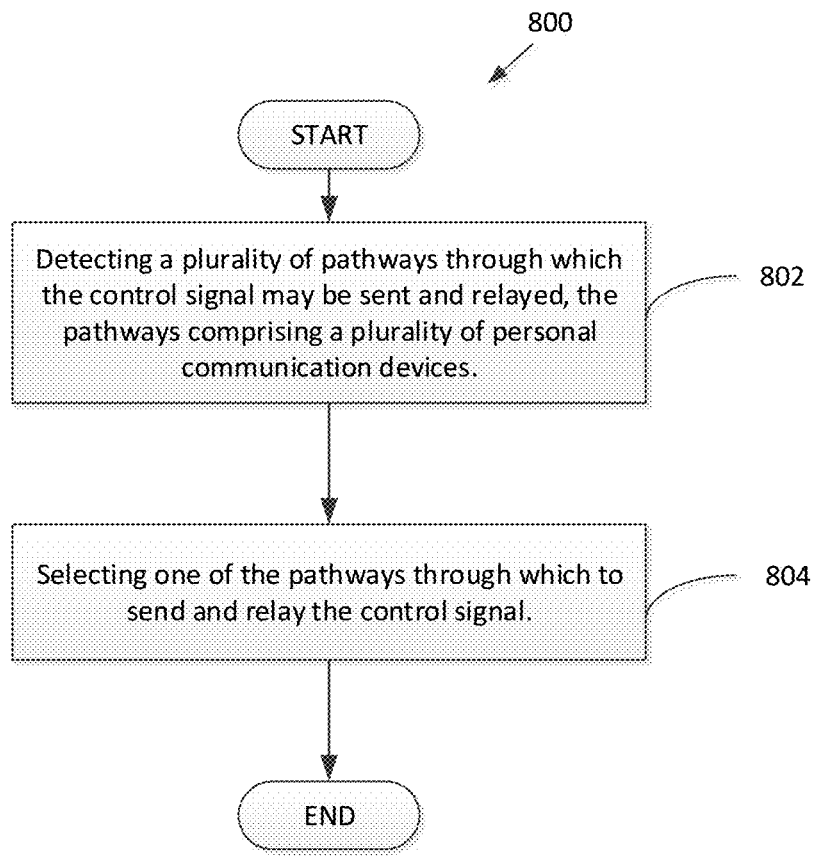
FIG. 8 illustrates a method of determining a best path for sending and relaying a signal according to some embodiments of the disclosure.

In other aspects of the disclosure, a method may include determining a best path through which to send and relay the control signal. FIG. 8 depicts a method 800 for determining a best path. The method 800 may comprise, at 802, detecting a plurality of pathways through which the control signal may be sent and relayed, the pathways comprising a plurality of personal communication devices. Then the method 800, at 804, may comprise selecting one of the pathways through which to send and relay the control signal. The selecting may based on one or more of the speed or type of one or more connections between the head end controller service and one or more or the personal communication devices and the proximity of one or more of the personal communications devices to a particular connected device. It may also be based on other factors, such as the reliability of one or more of the pathways, or the hardware characteristics of the personal communication device. Hardware characteristics may include, for example, power or battery status, processor speed, and types of radios available. The method 800 of determining the best path may be achieved by the HECS 203 executing logic and other commands to determine whether one or more personal communication devices 201 are in communication with a local device 206a-206e to be controlled. Determining the best path 800 may include determining that a first personal communication device 201 is in communication while a subsequent personal communication device 301, 302 is not in communication with a local device, and/or another personal communication device 301, 302 is in communication, but less efficient communication, with a local device 206a-206e.

Determining the best path 800 may include detecting the types of communications protocols available on a personal communication device 201 and/or within a local environment, such as, for example, determining whether a personal communication device 201 has Bluetooth communications capabilities, and, if not, determining that a second personal communication device 301 having such capabilities is the best path for sending a control signal.

Determining the best path 704 may also include determining whether routing a command signal through a mobile data connection 202, an internet service provider 204, or a third party HECS 207, is the appropriate route for sending a signal to a local device 206a-206e. Further examples of how a best path may be determined according to various embodiments will be described in more detail later in this disclosure.

It should be understood that the methods 700 and 800 may include any one of the actions discussed with reference to any of the previous FIGS. 1 through 6.

Some embodiments of the invention create and/or improve upon a large amount of functionality that a fixed, physical controller, such as the hub shown in FIG. 1, otherwise limits. Specifically, some embodiments may leverage the transient, mobile, and distributed nature of personal communication devices, along with their wide proliferation, their mobile data connections (e.g. 4G), and the fact that these device are typically nearby or with a user at all times, to enable a number of benefits and innovations. Additional examples of such benefits will be described later in this disclosure.

In some embodiments, the invention may be characterized as machine-readable logic configured to execute a method, such as the method 700 described above. For example, the machine-readable logic may be configured to cause a personal communication device 201 to control one or more local devices 206a-206e, which may be home, residential, business, or commercial devices configured to perform a task. The task may include one or more of: computing, lighting, heating, cooling, safety monitoring, or any other task for which IoT devices are developed, and the task may be responsive to a predetermined rule, or a command intent derived from a user input of the personal communication device 201, and/or a command intent derived from a user input of a subsequent personal communication device 301, 302. Some embodiments include logic or other code configured to, when executed, determine the "best path" to reach a second personal communication device 301 on the edge of a network and/or a local device on the edge of a network. In some embodiments, multiple virtual gateways 2011 may be combined to increase the range and availability of a path to reach at least one connected local device 206a-206e.

As stated above, some embodiments may be characterized as logic embedded in a machine-readable medium, which may include the virtual gateway 2011, HECS 203, and/or components of the computer system 600. As discussed previously, the logic may be downloaded as an application or 'app' on to a personal communication device such as the previously-described personal communication device 201. The personal communication device 201 will generally be any smartphone or tablet, but could include any network connected device that supports a download app ecosystem, including personal computers, set-top boxes, routers, etc. The user is thus not required to purchase new hardware, leading to savings in cost, energy, time, resources, and an increase in flexibility. Further, the logic may not necessarily require a user-interface, and may in some embodiments effectively run as a 'headless' application at the operating system level, e.g. as an always-on service that persists in the background.

Some embodiments may comprise cloud-based push messaging technology to quickly and asynchronously send requests from the head-end controller service or HECS 203 to a personal communication device 201 comprising a virtual gateway 2011. Requests or command intents that occur over a short-time span may be collated together into a single payload to reduce the number of messages that are sent to a personal communication device 201 over a short period of time. The time period in which requests are collated may be dynamically set depending on the origin of the request or command intent. If a manual command is initiated and the system receives no signals indicating other related commands are coming, the single manual command may be executed immediately. If a sequence of commands initiated via a routine or macro occurs, the delay may be increased to accommodate all commands so all arrive at the virtual gateway at the same time.

In some embodiments, a request or command intent may be sent or derived with no actual payload, but instead with content indicating the virtual gateway 2011 should make a request to a specified network resource to download the latest available requests. Further, the entire push request may be intentionally delayed by the head-end control service HECS 203 to allow the virtual gateway 2011 to enter a correct state (e.g. connect to a wireless network if it was previously disconnected), and this delay may be dynamically set by other pieces of software in the head-end control service HECS 203.

Message payloads may contain a number of pieces of metadata, such as, without limitation, the resource location at which additional data may be found, the amount of time to honor the request if there is trouble delivering the payload, device registration and user identifiers to ensure the data is delivered to the correct virtual gateway 2011, a payload that may generate a notification on the phone or personal communication device 201 itself, and/or the actual control or status request payload that is to be sent to the local device 206a-206e. This control or status request payload may in some embodiments contain metadata that indicates the delivery mechanism or protocol that the HECS 203 expects the virtual gateway 2011 to deliver the payload with, e.g. via HTTP or UPnP. The payload may also contain timing delay information that indicates an action should not be completed until the delay is over. This delay may be evaluated on the personal communication device 201 itself.

Additionally, the payload may contain more complex timing and feedback language that instruct the virtual gateway 2011 to wait for a specific status to occur on a local device 206a-206e, a specific response to be returned, a delay to occur, or any combination or sequence of these across multiple local devices 206a-206e to occur, prior to a command being executed. For example, it was previously described how a "wake up" status might be derived from a detection that a personal communication device 201 has been moved. In that instant, the virtual gateway 2011 and the local device 201 are effectively housed as the same unit. However, this disclosure contemplates that the HECS 203 and/or the virtual gateway 2011 might be configured to only derive a "wake up" status when the personal communication device 201 has been moved and a light 206e has been turned on, thus triggering music to begin playing at local device 206c. This has been described as one example only. The virtual gateway 2011 and/or the HECS 203 can thus be configured to require any number of status changes or rules to be met before returning a particular response, in order to allow a user a high degree of customization and control of multiple IoT devices.

The push message request or command signal may be sent to one or multiple local devices 206a-206e simultaneously. Depending on the type of operating system of the personal communication device 201 the message or command signal is being sent to, the infrastructure used to send the message or command signal may be dynamically selected.

Further, the method used to deliver a push message to the virtual gateway 2011 may change depending on availability. If available, a bi-directional means of communication (for example, a persistent socket connection) that keeps a channel open between the HECS 203 and the virtual gateway 2011 may be preferred. This enables full confirmation of message delivery, immediate and asynchronous status feedback from a local device 206a-206e, and the opportunity to send additional messages on the same channel.

If a bi-directional channel is unavailable, a request may be sent via a simple HTTP request. Due to limitations in infrastructure, a unidirectional channel may be an indication that the HECS 203 is unable to determine whether a message was delivered successfully and further executed successfully on the virtual gateway 2011 and local device 206a-206e. Status response data may also be unavailable. To improve upon this and/or overcome this problem, when a command is sent via a unidirectional channel, a flag may be created on the HECS 203. When a request successfully makes it to the virtual gateway 2011, this flag may then be set as true via a separate network request from the virtual gateway 2011 to indicate the command was executed successfully. If the flag never gets set to true after some period of time, the virtual gateway 2011 may include logic or an input indicating the virtual gateway 2011 is to not execute through with expired command requests, and the HECS 203 can make a subsequent request or requests if it is desired in the particular local device 206a-206e and/or scenario. Various methods and logic may be applied to optimize the number and frequency of requests (e.g. exponential back-off) to reduce the number of request and improve eventual success. The number of requests may be limited or a total time limit for attempting to reach the device may be limited.

In some embodiments, the HECS 203 may utilize push messages to "ping" one or more virtual gateways 2011 to ensure that they are available. The virtual gateways 2011 themselves may in some embodiments also "ping" the HECS 203 to ensure the availability of the HECS 203 and the ability of the virtual gateway 2011 to access the HECS 203. If one or more pings fail over a specific time interval, the user and/or the system may be notified by way of any suitable means that the connection has been lost, and can be further instructed to take steps to identify and fix the issue.

The virtual gateway system and method described above preferably depends on personal communication devices 201, 301, 302, and as such, may be transient. This transience may be beneficial in a number of ways, especially in an increasingly mobile-focused and connected world. As the personal communication device 201 moves around with the user, the personal communication device 201 becomes a virtual gateway 2011 for whatever environment it is in. Regardless of a user location, the personal communication device 201 having a virtual gateway 2011 enables the user to interact with the local devices 206a-206e around them without requiring a fixed hub at each location, enabling benefits in reachability, convenience, and cost savings.

Further, as personal communication devices 201 continue to take the place as digital hubs in everyday lives, the number of peripherals that users connect to their personal communication devices 201 will continue to grow. The personal communication device 201 will be the ideal hub for such local devices 206a-206e, to act in many ways as a virtual gateway 2011 for the local devices 206a-206e to connect to. Because the phone or personal communication device 201 is on or near the user at all times, using a personal communication device 201 as a virtual gateway 2011 means the local devices 206a-206e have significantly better odds at communicating with the HECS 203 when it is most relevant.

In some embodiments, the personal communication device 201 may determine general network availability of the personal communication device 201 itself and other devices, which may include other personal communication devices 301, 302 and/or local devices 206a-206e within a network. As the personal communication device 201 is moved throughout the environment, connection (or lack of connection) to a local device 206a-206e or second mobile device 301, 302 may indicate state information about the environment and the local and/or mobile devices. Since the hub or virtual gateway 2011 is likely to be on a user most of the time, metadata like radio-based single strength (RSSI) for various types of radios (Wi-Fi, Bluetooth, etc.), may provide information about the environment without a separate application or SDK integration. This data may be used to approximate the user or personal communication device 201 location relative to an access point 205, approximate position in an environment, such as, for example inside or outside a home, and/or approximate the position or location of the local devices 206a-206e for which the personal communication device 201 serves as a virtual gateway 2011.

In some embodiments, multiple personal communication devices 201, 301, 302 in one environment can be leveraged as virtual gateways 2011 to increase the range of a local network, availability and/or uptime of a network and/or local device 206a-206e to be controlled. This improved range and/or availability may increase redundancy and/or create more than one path to a local device 206a-206e.

In some embodiments, if one personal communication device 302 leaves a local network, communication may still be possible with a local device 206a-206e on that network, if another personal communication device 201, 301 is present and continues to act as a virtual gateway 2011. If both personal communication devices 201, 301 are on the network, then the best path may be chosen to relay the message. Further, if one personal communication device 201 has a slow or limited connectivity, or is further away from an access point 205, a second personal communication device 301 also acting as a virtual gateway 2011 may be better able to reach the first virtual gateway 2011. This effectively creates a mesh network that may enable connected local devices 206a-206e that are at the far edge of a network to be reached at a greater distance than a single access point 205 may otherwise enable.

In some embodiments, if an environment contains multiple users who each have a personal communication device 201 as a virtual gateway 2011, a local device 206a-206e may able to be reached using a different personal communication device 301. In a home environment, a user may be able to reach a local device 206a-206e on the network via a second or another personal communication device 301 that exists on the network, such as where a second user is at home with the second personal communication device 301. It should be understood that a user need not necessarily be present or in the vicinity of a personal communication device 201. For example, a user may leave a personal communication device 201 at home, and the device may still act as a virtual gateway 2011 in some embodiments.

Further, given appropriate security and privacy safeguards, if the HECS 203 has an understanding of how to reach any local device 206a-206e, a series of virtual gateways 2011 may in some embodiments be leveraged as a means for connecting to any local device 206a-206e in the entire ecosystem of known local devices 206a-206e, even if that connected local device 206a-206e and virtual gateway 2011 do not belong to the same user. For example, a family member who regularly travels between two homes may have access to local devices 206a-206e at both homes, while a second user at the first home will only have access to the local devices 206a-206e at the first home, and a third user at the second home will only have access to the local devices 206a-206e at the second home.

As another related example, a first user may wish to control a connected device over which she has authority on a work network, and may use a co-worker's virtual gateway to gain control remotely. The first user may wish to turn on a light in her office, adjust the thermostat, and turn on her computer when she is a mile away from the office. The user may be able to reach these connected devices over which she has control via a co-worker's virtual gateway 2011 that is physically located in the office within short-range transmission distance of the devices, even if that co-worker doesn't share, or doesn't have authority over the connected devices. In this scenario, the HECS may receive a command intent from the first user's personal communication device over a mobile data connection. Then, the HECS may generate and send a control signal to the co-worker's virtual-gateway-enabled personal communication device. The co-worker's virtual gateway may then relay the control signal via a short-range transmission protocol to the first user's light, thermostat, and computer. In many embodiments, it may be possible that both the user and the co-worker are unaware that a connection is being made via the co-worker's device.

As previously discussed, in many embodiments, the HECS 203 may comprise logic to determine the "best path" to send or retrieve messages from one or more personal communication devices 201, 301, and 302. For instance, and as just one example, a personal communication device 201 may have a companion cloud service that exposes an API. Here, the HECS 203 may determine whether to send a signal to a personal communication device 201 via the device's cloud API or via a virtual gateway 2011. When there are more than one virtual gateways 2011 available, the HECS 203 may select the one most likely to deliver the message reliably. If the message delivery fails, the HECS 203 may discover or attempt to discover an alternative path.

This best-path decision process may generally decide between an existing vendor-provided cloud interface, and a virtual gateway 2011 that enables control from the local network. If a cloud API is available, this may typically be the best option, but unavailability or significant latency issues may actually mean utilizing the virtual gateway 2011 to send a request via a local connection may be the best strategy.

A number of factors may be considered in determining how to route a message, including but not limited to one or more of: speed to reach a local device 206a-206e, reliability of a path (e.g. confidence a request will reach device), communication feature-set (one-way vs two-way communication), feature set of a personal communication device 201, 301, 302 if multiple options are available (network strength, power usage, processor speed, network type, etc.), radio availability on a personal communication device 201, 301, 302—e.g. one device may not have Bluetooth low energy, one may not support Wi-Fi direct, etc. In some embodiments, a personal communication device 201 comprising a virtual gateway 2011 does not necessarily need to join a Wi-Fi network to communicate with a desired local device 206a-206e on the local network. Many local devices 206a-206e may be configured to provide have two methods of connection to the internet—via a local Wi-Fi network and via a carrier-based data connection, e.g. 4G. Given this, even if a personal communication device 201 is not on a Wi-Fi network, it may still be able to receive and transmit command requests from the HECS 203.

In some embodiments, personal communication devices 201 may also be supported creating a direct connection to a different local device 206a-206e without requiring a typical network that requires a router and wireless access point 205. Using a standard, such as Wi-Fi Direct, a standard Wi-Fi connection to a central router is not required, and instead the personal communication device 201 having a virtual gateway 2011 may receive a command from the HECS 203 via 4G and send a command to a local device 206a-206e via Wi-Fi direct. This may entirely eliminate the need for an existing Wi-Fi network to be set up in some situations.

In some embodiments, the reverse process may also be implemented, in that either the virtual gateway 2011 may be configured to specifically request a status update from a local device 206a-206e, which may be configured to respond over the same Wi-Fi direct connection, or the connected local device 206a-206e may asynchronously return a status update over the Wi-Fi direct connection, and data is uploaded to the HECS 203 via a mobile data connection 202.

In some embodiments, if the HECS 203 becomes unavailable, it may still be possible that some local control of local devices 206a-206e via a distributed set of virtual gateways 2011 that are connected locally (via Wi-Fi, Wi-Fi direct, Bluetooth, etc.) could still be completed. If a command is sent manually or a cached command has previously been issued and stored on the virtual gateway 2011 for later execution (e.g. always turn everything off at midnight), then the distributed nature of virtual gateways 2011 may enable a command to be executed even when the HECS 203 goes down and even if the virtual gateway 2011 the command is cached on is an inappropriate virtual gateway 2011 to actually execute the request.

Further, in some embodiments, if the HECS 2011 is available, propagation between local virtual gateways 2011 may find the best path between the HECS 203 and the local device 206a-206e and/or decide between cloud interface and virtual gateway 2011. This may include determining which personal communication device 201 acting as a virtual gateway 2011 is the best personal communication device 201 to use to reach a local device 206a-206e.

In some embodiments, the determination and request may be made without the need for a full round-trip failure response and reissuance from virtual gateway 2011 to HECS 203. For example, some personal communication devices 201 may not contain a specific transceiver or radio needed to reach a particular local device 206a-206e, so if a command is requested on a virtual gateway 2011 that cannot complete the request, that virtual gateway 2011 may be configured to forward the request on to a different personal communication device 201 that contains an appropriate radio and a virtual gateway 2011 that can execute the command to the local device 206a-206e. An older personal communication device 201 may not contain a Bluetooth radio, for example, while a different personal communication device 201 on the network may have a Bluetooth radio and be reachable. In this case, the virtual gateway 2011 in which a cached command is stored may be able to generate additional control commands directly instead of needing to communicate with the HECS 203.

This methodology could propagate for as long as possible until all paths have failed or one has succeeded, without requiring the HECS 203 to be involved. Given this approach, multiple transient virtual gateways 2011 may be used to create a local mesh network that can function to some degree without the HECS 203. One personal communication device 201 having a virtual gateway 2011 may send out a request not initiated by the HECS 203 (possibly manual or cached) that propagates to a second personal communication device 201 have a virtual gateway 2011, which is then able to perform the necessary action.

In conclusion, the present invention may be one or more of a device, system, method, and logic for providing a virtual gateway to a local device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for communicating to connected devices in a local environment,
the method comprising:
receiving, at a head end controller service comprising a software application executed on a remote server on the Internet, a command intent, the command intent indicating that a control signal for controlling an operation of a local connected device should be sent to the local connected device;
wherein a local connected device is local to a particular building environment and communicates via short-range protocols while it remains in the building environment;
detecting a plurality of pathways through which the control signal could potentially be sent and relayed, the pathways comprising a plurality of virtual-gateway-enabled personal communication devices,
determining a best path through which to send and relay the control signal, wherein determining the best path comprises:
checking a speed and a type of connection of two or more of the plurality of virtual-gateway enabled devices and;
selecting one of the pathways through which to send and relay the control signal;
sending, via an Internet or cellular data connection, the control signal from the head-end controller service to one of the virtual-gateway-enabled personal communication devices;
receiving the control signal at the one of the virtual-gateway-enabled personal communication devices; and
relaying the control signal from the one of the virtual-gateway-enabled personal communication devices to the local connected device via the one or more local radio frequency communication protocols,
wherein the one of the virtual-gateway-enabled personal communication devices is local to the building when it receives and relays the control signal and comprises:
a commercially available consumer computing device having a graphical user interface, a finite set of hardware components, and primary purposes other than the receiving and the relaying, and a downloadable software application on the computing device that executes the receiving and the relaying using only the finite set of hardware components of the computing device and no other additional hardware external to the computing device, the downloadable software application being:
    displayable on the graphical user interface,
    capable of receiving user inputs via the graphical user interface, and
    capable of executing the receiving and the relaying both when it is displayed and not displayed.

2. The method of claim 1, wherein receiving the command intent further comprises:
    receiving state or environmental information from one or more of the plurality of virtual-gateway-enabled personal communication devices that specifies that a particular control signal should be sent to a particular local connected device, the state or environmental information comprising one or more of:
    a movement of one or more of the virtual-gateway-enabled personal communication device;
    a time of day;
    a weather condition;
    a user activity on one or more of the virtual-gateway-enabled personal communication devices;
    a proximity of one or more of the virtual-gateway-enabled personal communication devices to a particular local connected device.

3. The method of claim 1, wherein the command intent comprises one or more commands programmed by a user to occur at a pre-determined time.

4. The method of claim 1, wherein the control signal is stored at one or more of the virtual-gateway-enabled personal communication devices for a period of time before being relayed to the local connected device.

5. The method of claim 1, wherein the control signal is stored at one or more of the virtual-gateway-enabled personal communications device and is sent to a local connected device repeatedly.

6. The method of claim 1, further comprising:
    detecting, at one or more of the virtual-gateway enabled personal communication devices, that the connected device is able to receive control signals only through one of:
    a third-party head-end controller service of the local connected device or
    a network bridge of the local connected device,
    and wherein relaying the control signal from the one of the one or more virtual-gateway-enabled personal communication devices to the connected device further comprises routing the control signal through the third-party head-end controller service or the network bridge of the local connected device.

7. The method of claim 1, wherein the selecting is further based on one or more of:
    the proximity of one or more of the plurality of virtual-gateway-enabled personal communications devices to a particular local connected device;
    the reliability of one or more of the pathways, and;
    the processing capabilities of one or more of the plurality of virtual-gateway-enabled personal communication devices.

8. The method of claim 1, wherein the receiving, at the head end controller service further comprises receiving the command intent from a first virtual-gateway-enabled personal communication device located outside of a local environment of the local connected device, and wherein the control signal is sent to a second virtual-gateway-enabled personal communication device that is located within the local environment of the local connected device.

9. The method of claim 1, wherein the control signal is a first control signal, and further comprising:
    sending the first control signal and one or more additional control signals to the one or more virtual-gateway-enabled personal communication devices through a single payload when the first control signal and one or more additional control signals are scheduled to be sent during a pre-determined window of time.

10. The method of claim 1, wherein the computing device with primary purposes other than gateway functionality comprises one of:
    a smartphone,
    a tablet computer,
    a personal computer,
    a television,
    a television controller,
    a media player device, and
    a wearable computing device.

11. The method of claim 1, further comprising:
    requesting, by one or more of the virtual-gateway-enabled personal communication devices, any available command intents from the head-end controller service, and
    sending, from the head-end controller service, a push request to one or more of the virtual-gateway-enabled personal communication devices in response to the requesting.

12. The method of claim 11, wherein the sending is intentionally delayed by the head-end controller service while waiting for one or more of the virtual-gateway-enabled personal communication devices to enter a preferred communication state.

13. The method of claim 1, wherein the control signal is sent from the head-end controller service to one or more of the virtual-gateway-enabled personal communication devices via a unidirectional channel, and further comprising:
    creating a flag at the head-end controller service to be set to true if the head-end controller service receives confirmation that the control signal has been received by the one or more virtual-gateway-enabled devices,
    sending, via a network request from the one or more virtual-gateway-enabled personal communication devices, information indicating that the control signal has been received by the one or more virtual-gateway-enabled communication devices, and
    setting the flag to true.

14. The method of claim 1, wherein the control signal is sent from the head-end controller service to the one or more virtual-gateway-enabled personal communication devices via a unidirectional channel, and further comprising:
    creating a flag at the head-end controller service to expire if the head-end controller service does not receive confirmation that the control signal has been received by one or more of the virtual-gateway-enabled devices within a pre-determined period of time, and
    upon expiration of the flag, directing one or more of the virtual-gateway-enabled personal communication devices not to execute the control signal.

15. A system for communicating to connected devices in a local environment, the system comprising:
    a remote server,
    a head-end controller service comprising a software application executed on the remote server on the Internet configured to:

receive, at the remote server, a command intent, generate a control signal for controlling an operation of a local connected device, wherein the local connected device is local to a particular building environment and communicates via short-range protocols while it remains in the building environment, detect a plurality of pathways through which the control signal could potentially be sent and relayed, the pathways comprising a plurality of virtual-gateway-enabled personal communication devices, determine a best path through which to send and relay the control signal by checking a speed and a type of connection of two or more of the plurality of virtual-gateway-enabled personal communication devices and;

select one of the pathways through which to send and relay the control signal;

send, via an Internet or cellular data connection, the control signal from the server to one of the virtual-gateway-enabled personal communication devices, wherein the one of the virtual-gateway-enabled communication devices is local to the building when it receives and relays the control signal and comprises a commercially available consumer computing device having a graphical user interface, a finite set of hardware components, and primary purposes other than receiving and relaying of the control signal a downloadable software application downloaded on the computing device, the application being configured to execute receiving the control signal from the head-end controller service through the personal communication device and relaying the control signal to the connected device using only the finite set of hardware components of the computing device and no other additional hardware external to the computing device, when the computing device is local to the building environment, the downloadable software application being:

displayable on the graphical user interface, capable of receiving user inputs via the graphical user interface, and capable of executing the receiving and the relaying both when it is displayed and not displayed.

16. The system of claim 15, wherein the head-end controller service is further configured to:

receive state or environmental information from the one or more personal communication devices that specifies that a particular control signal should be sent to a particular local connected device, the state or environmental information comprising one or more of:

a movement of the one or more personal communication devices;

a time of day;

a weather condition;

a user activity on the one or more personal communication devices;

a proximity of the one or more personal communication devices to a particular local connected device.

17. The system of claim 15, wherein one of the head-end controller service and the downloadable software application is further configured to:

receive a command from a user to send a control signal to one or more local connected devices at a pre-determined time.

18. The system of claim 15, wherein the head-end controller service sends a control signal to the application, and the downloadable software application stores the control signal at the one or more personal communication devices for a period of time before relaying the control signal to the local connected device.

19. The system of claim 15, wherein the downloadable software application is further configured to store one or more control signals at the one or more personal communications devices and send the one or more control signals to one or more local connected devices repeatedly.

20. The system of claim 15, wherein one of the head end controller service and the downloadable software application is further configured to:

detect that the local connected device is able to receive control signals only through one of:

a third-party head-end controller service of the local connected device or a network bridge of the local connected device; and relay the control signal from the one or more personal communication devices to the local connected device by routing the control signal through the third-party head-end controller service or the network bridge of the local connected device.

21. The system of claim 15, wherein the selecting is further based on one or more of:

a proximity of the one or more of the personal communications devices to a particular local connected device;

a reliability of one or more of the pathways, and;

processing capabilities of one or more of the personal communication devices.

22. The system of claim 15, wherein:

the one of the one or more personal communication devices is a first personal communication device outside of a local area network of the local connected device, and the command intent is received at the head end controller service via a mobile data connection, and further comprising:

a second downloadable software application on a second personal communication device within the local area network of the local connected device.

23. The system of claim 15, wherein the control signal is a first control signal, and wherein the head-end controller service is further configured to:

send the first control signal and one or more additional control signals to the one or more personal communication devices through a single payload when the first control signal and one or more additional control signals are scheduled to be sent during a pre-determined window of time.

24. The system of claim 15, wherein the commercially available consumer computing device comprises one of:

a smartphone, a tablet computer, a personal computer, a television, a television controller, a media player device, and a wearable computing device.

25. A non-transitory, tangible computer readable storage medium, encoded with processor readable instructions to perform a method for communicating to connected devices in a local environment, the method comprising:

receiving, at a head end controller service comprising a software application executed on a remote server on the Internet, a command intent, the command intent indicating that a control signal for controlling an operation of a local connected device should be sent to the local connected device;
wherein a local connected device is local to a particular building environment and communicates via short-range protocols while it remains in the building environment;
detecting a plurality of pathways through which the control signal could potentially be sent and relayed, the pathways comprising a plurality of virtual-gateway-enabled personal communication devices,
determining a best path through which to send and relay the control signal, wherein determining the best path comprises:
  checking a speed and a type of connection of two or more of the plurality of virtual-gateway enabled devices and;
  selecting one of the pathways through which to send and relay the control signal;
sending, via an Internet or cellular data connection, the control signal from the head-end controller service to one of the virtual-gateway-enabled personal communication devices;
receiving the control signal at the one of the virtual-gateway-enabled personal communication devices; and
relaying the control signal from the one of the virtual-gateway-enabled personal communication devices to the local connected device via the one or more local radio frequency communication protocols,
wherein the one of the virtual-gateway-enabled personal communication devices is local to the building when it receives and relays the control signal and comprises:
  a commercially available consumer computing device having a graphical user interface, a finite set of hardware components, and primary purposes other than the receiving and the relaying, and
  a downloadable software application on the computing device that executes the receiving and the relaying using only the finite set of hardware components of the computing device and no other additional hardware external to the computing device, the downloadable software application being:
    displayable on the graphical user interface,
    capable of receiving user inputs via the graphical user interface, and
    capable of executing the receiving and the relaying both when it is displayed and not displayed.

26. A system comprising:
means for receiving, at a head end controller service comprising a software application executed on a remote server on the Internet, a command intent, the command intent indicating that a control signal for controlling an operation of a local connected device should be sent to the local connected device;
  wherein a local connected device is local to a particular building and communicates via short-range protocols while it remains in the environment;
means for detecting a plurality of pathways through which the control signal could potentially be sent and relayed, the pathways comprising a plurality of virtual-gateway-enabled personal communication devices
means for determining a best path through which to send and relay the control signal, wherein determining the best path comprises:
  checking a speed and a type of connection of two or more of the plurality of virtual-gateway enabled devices and;
  selecting one of the pathways through which to send and relay the control signal;
means for sending, via an Internet or cellular data connection, the control signal from the head-end controller service to one of the virtual-gateway-enabled personal communication devices;
means for receiving the control signal at the one of the virtual-gateway-enabled personal communication devices; and
means for relaying the control signal from the one of the virtual-gateway-enabled personal communication devices to the local connected device via the one or more local radio frequency communication protocols,
  wherein the one of the virtual-gateway-enabled personal communication devices is local to the building when it receives and relays the control signal comprises:
    a commercially available consumer computing device having a graphical user interface, a finite set of hardware components, and primary purposes other than the receiving and the relaying, and
    a downloadable software application on the computing device that executes the receiving and the relaying using only the finite set of hardware components of the computing device and no other additional hardware external to the computing device, the downloadable software application being:
      displayable on the graphical user interface,
      capable of receiving user inputs via the graphical user interface, and
      capable of executing the receiving and the relaying both when it is displayed and not displayed.

* * * * *